United States Patent [19]
Fanelli et al.

[11] Patent Number: 5,715,916
[45] Date of Patent: Feb. 10, 1998

[54] WHEEL BRAKE ASSEMBLY

[75] Inventors: Michael William Fanelli, Centerville; Jerome Albert Limpach, Tipp City; Norbert John Green, Jr., Trotwood; Carlton Huston Fox, Jr., Clayton; Donald Jeffrey Moyer, Dayton, all of Ohio

[73] Assignee: General Motors Corporation, Detroit, Mich.

[21] Appl. No.: 694,887

[22] Filed: Aug. 9, 1996

[51] Int. Cl.⁶ .................................................. F16D 65/22
[52] U.S. Cl. ............................ 188/106 A; 188/70 R; 188/218 R
[58] Field of Search .................... 188/18 A, 70 R, 188/336–339, 106 A, 106 F, 205 R, 206 R, 206 A, 218 A, 218 R

[56] References Cited

U.S. PATENT DOCUMENTS

| | | | |
|---|---|---|---|
| 2,167,683 | 8/1939 | Sauzedde | 188/152 |
| 3,447,646 | 6/1969 | Pace | 188/70 R |
| 3,850,266 | 11/1974 | Hesskamp et al. | 188/70 R |
| 3,915,063 | 10/1975 | Ditlinger | 91/189 |
| 4,179,167 | 12/1979 | Lura et al. | 308/189 A |
| 4,854,423 | 8/1989 | Evans et al. | 188/70 R |
| 4,874,064 | 10/1989 | Oono | 188/70 R |
| 4,995,481 | 2/1991 | Temple et al. | 188/70 R |
| 5,180,037 | 1/1993 | Evans | 188/70 R |
| 5,246,093 | 9/1993 | Wang | 188/336 |
| 5,322,145 | 6/1994 | Evans | 188/106 A |
| 5,529,149 | 6/1996 | Johannesen et al. | 188/325 |

*Primary Examiner*—Chris Schwartz
*Attorney, Agent, or Firm*—Jeffrey A. Sedlar

[57] ABSTRACT

A parking brake assembly includes a lever that translates pivoting rotation to sliding movement of a tappet in contact with a braking shoe to effect expansion of the brake shoe against the inside diameter of a rotating element. The rotating element is, in more specificity, a rotor carried by a spindle that is rotatably supported by bearings. The bearings are carried by the actuator housing which additionally carries the lever and tappet of the parking brake assembly.

3 Claims, 2 Drawing Sheets

5,715,916

WHEEL BRAKE ASSEMBLY

BACKGROUND OF THE INVENTION

The present invention relates to a brake actuator and more particularly, to a mechanical drum brake actuator and wheel bearing assembly.

Brake actuators of numerous configurations are known. Mechanical drum brake actuators are primarily applicable to providing parking brake functions in a vehicle. Such a brake actuator operates to transmit force, which is generally applied by a cable mechanism, to one or two semi-circular brake shoes thereby applying force to a brake drum or disk as a rotating element and achieving the braking function. A conventional brake actuator typically forces the shoes against the rotating element through a piston or strut that is connected to an operator.

The brake actuator is generally mounted on a backing plate that covers the inboard side of the rotating element. This requires making the relatively large backing plate of a sufficiently heavy material to provide adequate structural integrity. This leads to a somewhat heavy assembly.

The parking brake actuator system is conventionally assembled on the vehicle as an independent element. The rotating element is itself an autonomous unit and is supported on a hub and bearing assembly which is also assembled into the vehicle as an independent unit. Such brake actuators generally include an undesirable number of component parts which complicates assembly of the brake actuator. Accordingly, a brake actuator of simplified configuration for assembly purposes would be preferable.

SUMMARY OF THE INVENTION

The present invention provides a brake actuator which includes an actuator body serving the purposes of providing both housing and mounting features. A tappet is slidably carried by the actuator body and a pivotable lever engages the tappet. Application of input force to the lever is transmitted therethrough to the tappet which is forced to move linearly to provide expansive movement to the brake shoe in effecting braking forces.

The actuator body also serves the function of the hub and outer bearing race for the associated wheel assembly's rotating element. As a result, structural integrity of the actuator body is optimized. The parking brake loading is transmitted through the actuator body including the hub, relatively directly to the vehicle's superstructure. The direction of loading coincides with the greatest sectional thickness of the hub's flange which creates a substantial beam resisting deflection.

DETAILED DESCRIPTION OF THE PRESENTLY PREFERRED EMBODIMENT

Figure 1:
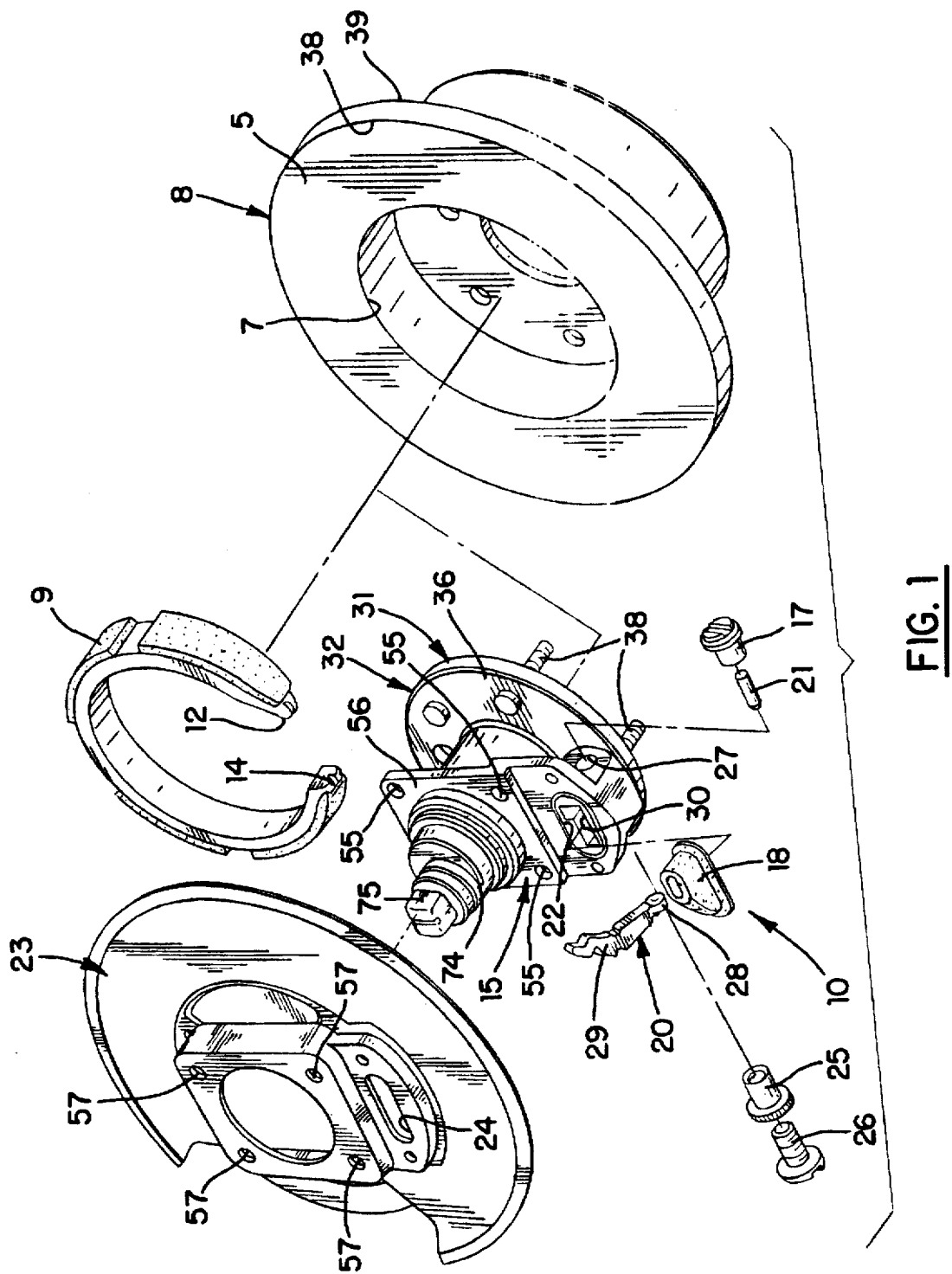
FIG. 1 is a partially exploded view of a brake actuator in accordance with the present invention.

Referring to FIG. 1, illustrated is a brake actuator system designated generally as 10 and principally for use in a drum-type brake including drum and rotor type parking brake systems that use a separate caliper-type service brake. Brake actuator 10 is operable with one 330° circumferential brake shoe 9 or two brake shoes (not illustrated) connected together at opposite ends in a conventional manner. In either case, two brake shoe ends 12 and 14 are forced apart in operation of the brake assembly 10 to expand the shoe 9 forcing it against the interior wall 7 of rotor 8 to effect braking operation. The rotor 8 includes an annular plate 5 with opposed braking surfaces 38 and 39 that is conventionally engaged by a brake caliper assembly operating as the associated vehicle's service brake.

Tappet 17 is slidably carried in bore 27 of actuator body 15 and engages end 12 of shoe 9. An adjuster nut 25 and adjuster screw 26 are positioned in the opposite end of bore 27 from tappet 17 with screw 26 engaging end 14 of shoe 9. The screw 26 and nut 25 are provided in a threadedly engaged relationship to provide for adjustment in the parking brake system for the expansion of shoe 9 in contacting wall 7 of rotor 8.

The lever 20 includes a head 28 and an input arm 29 and is inserted through slot 30 of actuator body 15. The slot 30 intersects the bore 27. The head 28 of lever 20 engages push rod 21 which also engages tappet 17 so that force input through arm 29 of lever 20 is transferred from head 28 to pin 21 and therethrough to tappet 17. Therefore, the application of force to arm 29 results in sliding movement of the tappet 17 within bore 27 to effect expansion of the shoe 9. The lever 20 is surrounded by a resilient protective boot 18 which is received within seat 22 of actuator body 15. The actuator body 15 is assembled into hub and bearing assembly 31 and the parking brake assembly 10 is assembled onto backing plate 23 which is stamped of a relatively light material for assembly into a vehicle.

Figure 2:
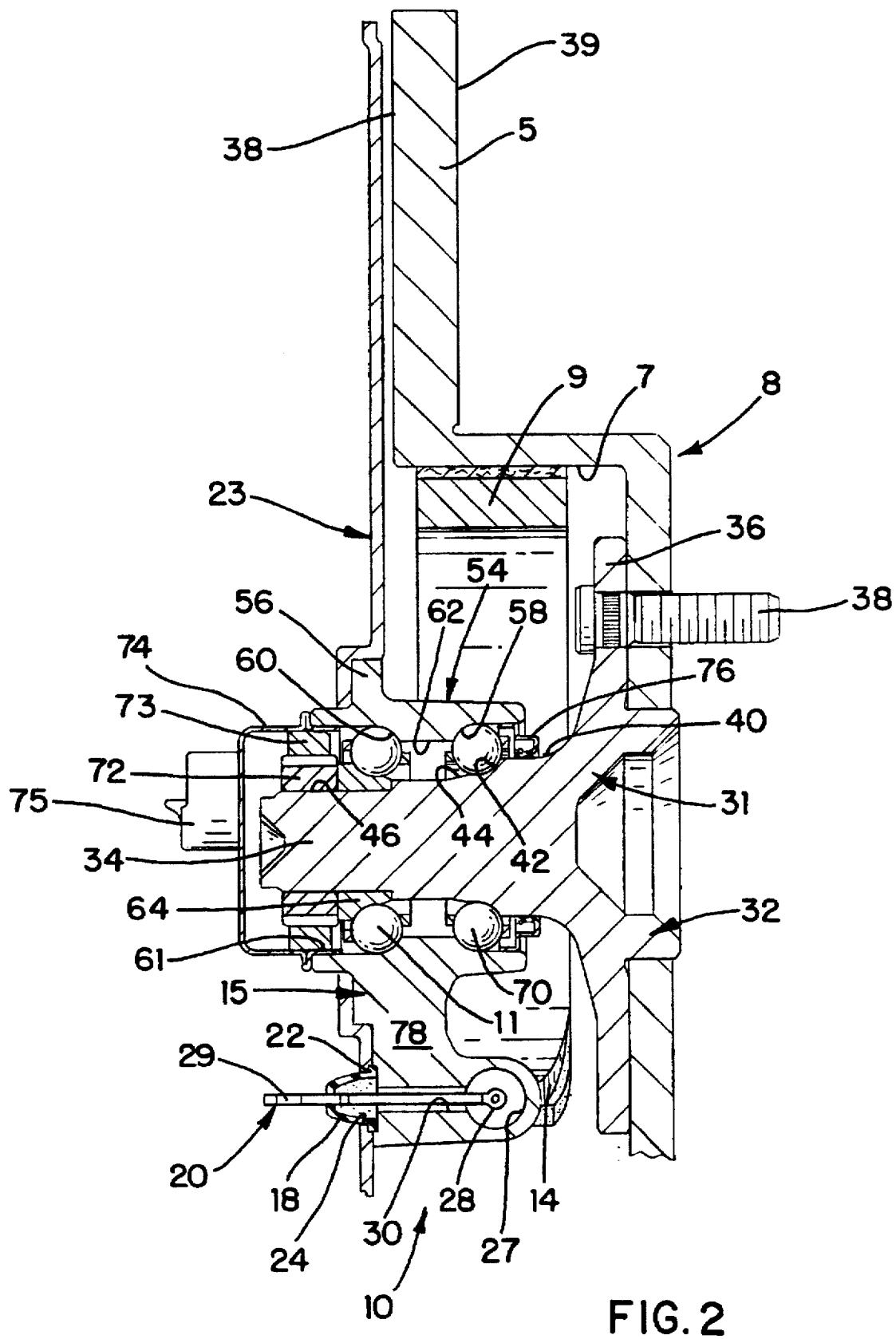
FIG. 2 is a sectional view through the brake actuator of FIG. 1 in the assembled condition.

Referring to FIG. 2, details of the hub and bearing assembly 31 are illustrated in greater detail. The hub and bearing assembly 31 incorporates a rotatable spindle 32 comprising an axle 34 and integral circular mounting flange 36. The mounting flange 36 carries a plurality of bolts 38 for engagement with rotor 8 and an associated wheel (not illustrated) of the vehicle. The axle 34 includes a seal land 40, an internal raceway 42, a conical section 44 and a cylindrical portion 46 of reduced diameter.

The hub and bearing assembly 31 also includes the actuator body 15 which has an outer race 54 and a flange 56 for mounting to the backing plate 23 and to the supporting superstructure (not illustrated) of the vehicle. As can be seen in FIG. 1, the flange 56 includes four openings 55 which correspond with four openings 57 of the backing plate 23.

The outer race 54 has a pair of axially spaced angular contact raceways 58 and 60 separated by a reduced diameter segment 62 of the bore 61 through the actuator body 15. Two rows of angular contact bearing balls run on axle 34 including an outer row 70 that runs directly on axle 34 and an inner row 11 that runs on a separable race 64. The spindle 32 is thereby rotatably supported by the outer row 70 and the inner row 11 on the nonrotatable outer race 54 at raceways 58 and 60.

Race 64 is maintained in its proper operative position and under the proper preload against ball row 11 by an adjacent toothed wheel speed sensor ring 72 which is fixed in position on axle 34. The ring 72 rotates with the spindle 32 and is radially adjacent a fixed wheel speed sensor ring 73. Sensor ring 73 is carried in bearing cover 74 which is pressed into bore 61 of actuator housing 15. The cover 74 carries an electrical connector 75 for the wheel speed sensor element. The wheel speed sensor is of the magnetic reluctance type and is carried within the seal portion of hub and bearing assembly 31. The opposite end of bore 61 carries seal assembly 76 which engages the seal land 40 and is pressed into the bore 61.

The parking brake lever 20 extends through opening 24 of backing plate 23. Through means of a cable (not illustrated) a manual application of force effected by the vehicle's operator to a parking brake pedal or hand lever effects pivoting movement of the lever 20 applying force to push rod 21 and tappet 17 to expand the shoe 9 against the wall 7 of rotor 8. The shoe 9 carries a lining of friction material 6 to effect braking action against the rotor 8.

The force applied to the push rod 21 by the head 28 of lever 20 is offset by the actuator body 15. This braking force is carried by the relatively large cross section 78 of actuator body 15 which is securely mounted to the vehicle's supporting structure by the openings 55 of mounting flange 56. Therefore, the parking brake assembly 10 includes the hub and bearing assembly 31 which are assembled into the vehicle at the same time by means of the mounting flange 56.

What is claimed is:

1. A wheel brake assembly comprising:

a brake shoe;

a slidable element engaging the brake shoe and slidable to effect movement of the brake shoe;

an actuator body slidably carrying the slidable element including an outer race formed by the actuator body; and a bearing assembly riding in the outer race and supporting a rotatable spindle, wherein the actuator body includes a first bore carrying the bearing assembly, a second bore carrying the sliding element and a slot intersecting the second bore with a lever extending through the slot and further comprising a pushrod carried in the second bore and extending between the lever and the sliding element.

2. A wheel brake assembly according to claim 1 wherein the actuator body includes a mounting flange that surrounds the first bore and wherein the actuator body has a relatively large cross section near the second bore so that forces generated by actuating the wheel brake assembly are offset by the actuator body and are carried through the mounting flange.

3. A wheel brake assembly comprising:

an actuator body having a first bore and a second bore with a slot intersecting the second bore;

a bearing race defined by the actuator body in the first bore;

a bearing row running on the bearing race;

a spindle supported by the bearing row;

a rotor carried on the spindle;

a wheel speed sensor carried on the spindle;

a tappet carried in the second bore;

a lever extending through the slot and into the second bore;

a pushrod carried in the second bore between the lever and the tappet; and a brake shoe engaging the sliding element wherein the brake shoe is movable by the sliding element to engage the rotatable element applying a braking force thereto.

* * * * *